Inventor
JOHN A. BELLIZZI

Patented Jan. 1, 1952

2,580,395

UNITED STATES PATENT OFFICE 2,580,395

TORQUE DYNAMOMETER

John A. Bellizzi, United States Navy

Application December 11, 1945, Serial No. 634,336

2 Claims. (Cl. 73—136)

(Granted under the act of March 3, 1883, as amended April 30, 1928; 370 O. G. 757)

This invention relates to a torque dynamometer for detecting and measuring transient torques.

In ascertaining the operating characteristics of a motor, it is often necessary to determine the presence and extent of torques, and particularly of transient torques, occurring during the operation of the motor. Transient torques may occur as a result of any one or a combination of a number of factors, a primary cause of transient torques arising out of the inherent nature of the driving forces applied to the motor. For example, where the motor is electrically powered, transient torques may occur as a result of the arrangement of teeth and slots in the rotor or stator, or to the use of commutators, all of these mechanisms producing intermittent pulses of power. Transient torques are also produced by natural frequencies of oscillation of the motor and its mounting.

Conventional shaft torsion dynamometers although capable of measuring transient torques in some instances, are practical only with high power machinery where the torques are large. The torsion shaft may then be large, long, rigid, and capable of giving measurable angles of twist while preserving shaft alignment. Such torsion shafts, however, are not suitable for use with high speed (10,000+ R. P. M.), low power machinery. Here the torques are low and consequently shafts of satisfactory length and rigid enough to maintain alignment are not twisted appreciably. A torsion shaft that would give a measurable twist with high speed, low power machinery would necessarily have to be so slender and long with low moment of inertia as to ruin the alignment between the driving and driven members by sagging. Such misalignment and the probable low critical speed of such a torsion shaft would make rotation at high speeds impractical and accordingly prevent testing at these speeds.

High speed, low power motors are often employed in, and particularly are found in aircraft electrical equipment, where they are used to operate the landing gear, cowl flaps, and other intermittent duty loads of short duration. In many instances the motors are operated only for a few seconds, this being particularly true of starting motors. As the motor speed increases after starting, its torque changes rapidly and detection of these changes requires instruments capable of responding with extreme rapidity to such changes. Since with high speed, low power motors the transient torques will have a high frequency with low energy content, any damping, such as is unavoidable with non-rigid torque measuring instruments, will tend to eliminate the transient torques from the indications produced thereby, thus making substantially impossible the detection of transient torques.

An object of the present invention is to provide a new and improved torque dynamometer, and more particularly a dynamometer for detecting and measuring transient torques.

A further object of the present invention is to provide a sensitive dynamometer for detecting and measuring transient torques which will require a minimum amount of torque for actuation.

A further object of the present invention is to provide a dynamometer for detecting and measuring transient torques which will be substantially rigid and avoid damping of transient torques.

In accordance with one embodiment of this invention, a dynamometer may be provided having a substantially cylindrical rotatable housing in which is coaxially disposed a rotatable shaft, which may be coupled to the output shaft of the motor to be tested. Two pairs of carbon piles, which are connected together through slip rings associated with the housing to form a bridge circuit are mounted on the housing and each pair of piles has disposed therebetween a piston arm rigidly fixed to and extending radially from the driven shaft of the dynamometer. As this shaft is rotated by the motor, the angular movement of the piston arms causes one of each pair of carbon piles to be compressed, while pressure is simultaneously removed from the other of each pair. The changes in the resistances of the piles occurring as a result of the changes in pressure thereon are indicated by the bridge circuit, and provide both a measure of and an indication of the torques occurring during the operation of the motor being tested.

Other objects and advantages of the present invention will be apparent from the following detailed description taken in conjunction with the drawings, wherein.

In order to indicate and measure transient torques in high speed, low power motors, the apparatus for detecting the transient torques and for measuring the extent of the transient torques must have a natural period of vibration substantially smaller than the minimum transient time to be detected and measured. For example, in order to measure a sine wave having a period of .01 second, it is desirable to have a measuring apparatus having a period on the order of .001 second. Conventional dynamometers employing resilient measuring means usually have periods far greater than .001 second, and consequently do not respond to transients of this order. Yet it will be readily apparent that with a medium, high speed motor, that is, for example, a motor having an output shaft rotating at approximately 6000 R. P. M., and having a single transient torque pulse each revolution, the transient pulse will have a period on the order of .01 second, thus requiring a dynamometer having a period of not greater than .001 second. Since motors are often used having much higher rotational speeds, correspondingly shorter period transients will be present. Further complicating the problem of measurement is the fact that ordinarily instead of a single transient per revolution, a number of transients will occur.

In order to provide a dynamometer capable not only of detecting but also of measuring transient torques occurring in motors operating at high rotational speeds with low power, in accordance with the present invention there has been provided a substantially rigid dynamometer having because of its essential rigidity a very short natural period. In a practical embodiment of this invention it has been determined that a dynamometer can be constructed in accordance with this invention to have a natural period on the order of .0005 second, or less, thus making readily feasible the detection and measurement of transients having very high frequencies of occurrence.

Figure 1:
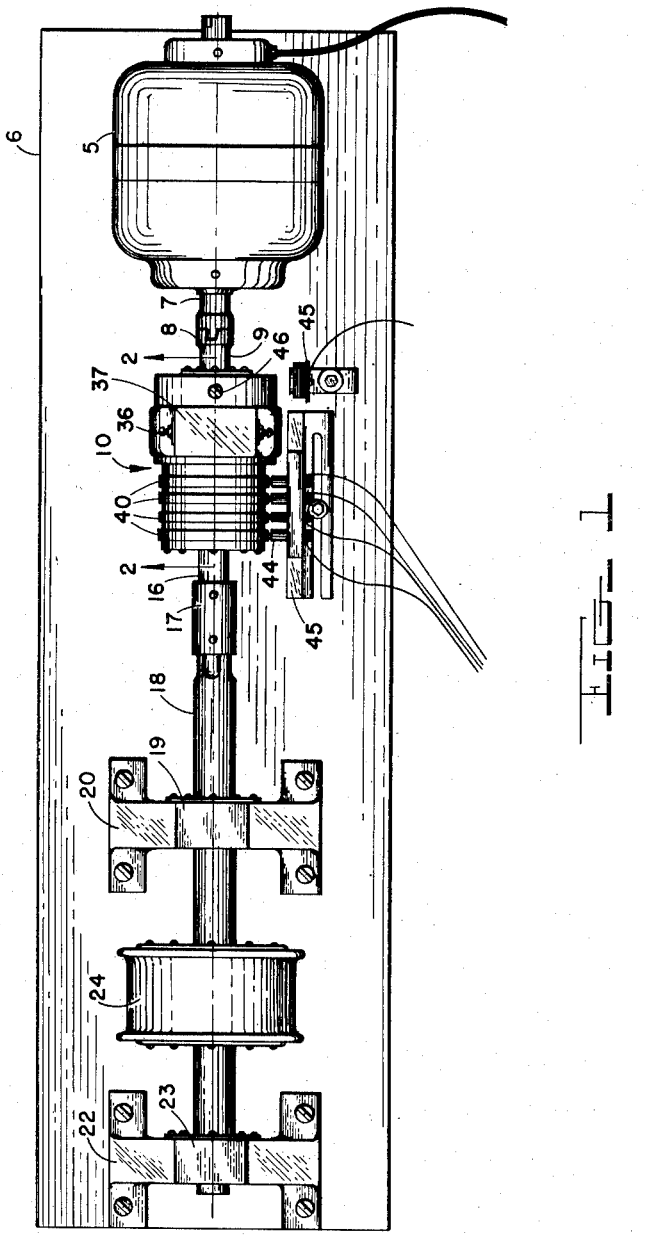
Fig. 1 is a plan view of a dynamometer constructed in accordance with this invention and having a motor associated therewith to be tested.
Figures 2, 3, 4:
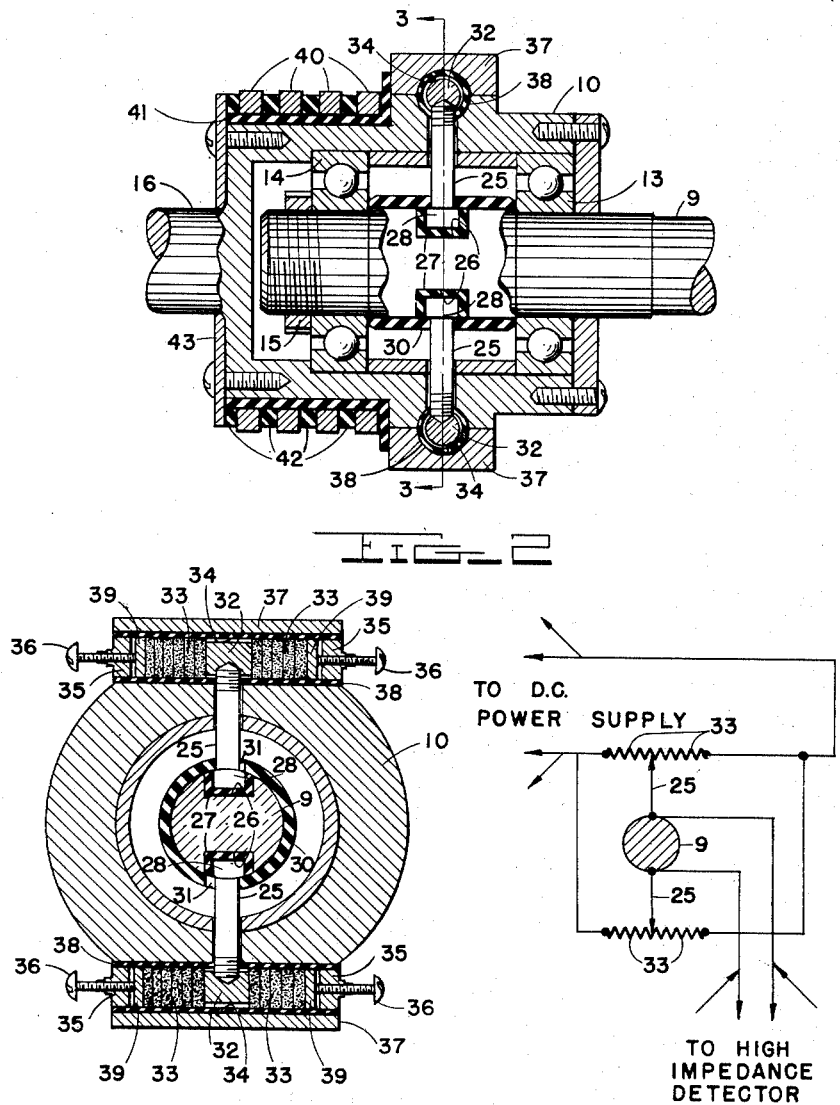
Fig. 2 is a fragmentary, enlarged longitudinal, sectional view, taken substantially along the line 2—2 of Fig. 1.
Fig. 3 is a vertical, sectional view, taken substantially along the line 3—3 of Fig. 2.
Fig. 4 is a schematic diagram showing the electrical circuit employed with this invention.

Referring now to the drawings, and particularly to Fig. 1 thereof, it will be seen that in this apparatus a motor 5 to be tested is mounted on a base 6 of the apparatus and an output shaft 7 of the motor is connected through a coupling 8 to a shaft 9, journaled in a dynamometer housing 10, the housing being of substantially cylindrical shape and hollow. Referring now to Fig. 2, it will be seen that shaft 9 is coaxially mounted in the housing on a pair of spaced, annular bearings 13 and 14, respectively mounted adjacent either end of the housing. Shaft 9 is retained in the housing by a collar 15, threaded on the left end of the shaft, as viewed in Fig. 2, the inner side of the collar bearing against the inner portion of the left side of the bearing 14.

An output shaft 16 is mounted on the left side of the housing, being axially aligned with the input shaft 9, and the shaft 16 is connected through a coupling 17 to a long shaft 18, axially aligned therewith which extends to the left, as viewed in Fig. 1, through a bearing 19 mounted in an upright bracket 20, which is mounted on the base 6 of the apparatus. A second bracket 22 is mounted on the left end of the base 6 and suitably spaced from the bracket 20, the bracket 22 having a bearing 23 similar to the bearing 19 mounted therein which serves as a support for the left end of the shaft 18.

A flywheel 24 is mounted on the shaft 18 substantially midway between the brackets 20 and 22 and is selected to provide a starting load simulating that encountered in the operation of the motor being tested. Braking means, not shown, may be associated with the flywheel as may be required. The supporting structure described provides a rigidly mounted and aligned system in which the several shafts are maintained in exact alignment at all times, thus avoiding the introduction of spurious transients. While the structure described is suitable, other supporting and aligning arrangements may be substituted therefor, as are well known to the art.

In order to apply the driving force from the motor to the flywheel through the dynamometer and to determine the extent of transient torques present in the operation of the motor, a pair of arms 25 have been provided and are rigidly mounted on the shaft 9, the arms 25 extending radially from diametrically opposite sides thereof. Since the arms are associated with the electrical circuit of the dynamometer, it is desirable that they be insulated from the shaft 9. This is accomplished by providing a cylindrical recess 26 on either side of the shaft, in each of which is disposed a cup-shaped lining 27 of an electrical insulating material having high dimensional stability, such as certain phenolic impregnated materials well known to the art. The inner end of each piston arm is enlarged to form a cylindrical head 28 which is mounted in the aperture or recess 26, the lining 27 insulating the arm from the shaft and providing a rigid support therefor. In order to retain the heads 28 of the piston arms 25 in position on the shaft, a suitable sleeve 30 formed of electrically insulating material having sufficient mechanical strength may be mounted on the shaft prior to placing the heads of the piston arms in their respective recesses. The sleeve is provided with key shaped apertures in the sides thereof suitably located so that after the heads 28 have been inserted into the recesses, then by rotating the sleeve relatively to the shaft 9, the heads may be locked in position.

The outer end of each piston arm 25 has mounted thereon a cylindrical block 32, the axis of which extends substantially at right angles to the axis of the arm; each block is disposed between one of the two pairs of spaced carbon piles 33, which are mounted on the periphery of the housing 10 tangentially with respect to the axis of the shaft 9 so that angular movement of the arms with respect to the housing, resulting from the operation of the motor 5 and rotation of the shaft 9, will cause compression of one of each set of piles, and reduction in pressure on the other. The piles are of conventional design and comprise a plurality of laminations of carbon discs, and the piles are mounted in cylindrical chambers 34 formed between the housing wall and caps 37. Electrically insulating sleeves 38 are mounted in each of the shoulder apertures 34 to insulate the carbon piles from the housing. Since it is desirable to preload these carbon piles to provide a high frequency of response, and from time to time to adjust this preloading pressure, discs 39 are mounted at the outer end of each pile and are movable with respect to the housing apertures 34 by adjusting screws 36 threadably mounted in fixed end plates 35 or the apertures 34. The discs 39, screws 36 and end plates 35 thus provide a substantially nonresilient or rigid connection of the outer ends of the carbon piles 33 with the housing.

The motor 5 is thus caused to rotate the flywheel 14 through the shaft 9 and housing 10, rotation of the shaft causing the heads of the arms 25 to bear on one of each set of carbon piles and to move away from the other of each set. The changes in pressure cause a corresponding change in the resistances of the piles, the resistance increasing with decreased pressure. In order to utilize this change in resistance to provide detection and measurement of transient torques, the four piles are connected in a bridge circuit, as shown in Fig. 4, whereby the change is accumulated in the sense of push-pull operation to vary the reading of a suitable indicating device, not shown, such as a high impedance detector. Connection of the piles to the indicating device is provided by four slip rings 40 which are mounted about the housing 10, being insulated therefrom by a flanged sleeve 41 of electrically insulating material and spaced and insulated from each other by rings 42 of electrically insulating material. The sleeve 41 and rings 40 and 42 are retained on the housing 12 by an endplate 43 which is fixed to the left end of the housing 12 as shown in Figs. 1 and 2. The slip rings are connected to the piles by suitable leads disposed within the housing 10, as is well known in the art, and spring contacts 44 are mounted on a bracket 45, supported on the base 6. The spring contacts are in turn suitably connected to the indicating device so that the four piles form, in effect, the four arms of a Wheatstone bridge circuit. A suitable source of current is associated with the circuit, as shown in Fig. 4, and the piles are so balanced that when the motor is not operating, no current will flow through the indicating device. When the motor is operated this balance is disturbed and the changes in resistances as indicated by the bridge circuit will be essentially proportional to the torques present. By virtue of the bridge circuit and the push-pull operation so produced, the essential non-linearity of the carbon piles, is substantially compensated. Since the system as described is essentially rigid, the apparatus will respond to transient torques having very high recurrence rates.

It will be apparent that a device such as an oscilloscope may be employed as the indicating device and that the sweep of the oscilloscope may be synchronized with the rotation of the motor 5 to provide not only an indication and measure of transient torques but also to indicate at what point in any given revolution of the motor a particular transient occurs. The synchronizing means may comprise a pick up coil 45 suitably mounted adjacent the housing 10 so that as a magnet 46 mounting on the periphery of the housing moves past the coil during the rotation of the housing, a current is induced in the coil. This current may be applied to the oscilloscope to trigger the sweep once for every revolution, thus synchronizing the oscilloscope with the rotation of the motor being tested.

While but one embodiment of this invention has been shown and described, it will be understood that changes and modifications may be made therein without departing from the spirit and scope of the present invention.

The invention shown and described herein may be manufactured and used by or for the Government of the United States of America without the payment of any royalties thereon or therefor.

What is claimed is:

1. A dynamometer for detecting and measuring transient torques comprising a shaft carrying a cylindrical housing fixed to one end thereof in axial alignment therewith, a pair of axially spaced ball bearings mounted within the housing, a second shaft having one end extended into said housing and journaled in said bearings, a pair of carbon piles carried by the housing spaced radially from said second shaft and rectilinearly aligned perpendicular to a radius of the second shaft and lying in a plane perpendicular to the shaft axis, a block element situated between said piles and constrained to move in a straight line in alignment with the alignment of said pair of carbon piles, means carried by the housing at opposite ends of the pair of piles for adjustably and rigidly clamping the piles against the said block, an arm carried by the second shaft within the housing extending radially outward from the shaft into mechanical engagement with the said block for transmitting tangential pressure from said arm to said block and a plurality of slip rings carried by said housing.

2. A dynamometer for detecting and measuring transient torques comprising a cylindrical housing fixed to a shaft, a pair of axially spaced antifriction bearings mounted within the housing adjacent either end of the housing, a second shaft mounted within and supported by the housing through said bearings, a pair of cylindrical chamber elements carried by the housing on diametrically opposite sides, said chamber elements being fixed in position with their axes perpendicular to a radius of the second shaft and lying in a plane perpendicular to the shaft axis, a pair of arms carried by the said second shaft extending radially from said shaft each into one of said cylindrical chamber elements, a cylindrical block slidably mounted in each chamber element at the outer end of each arm each engaged by its respective arm for imparting a sliding movement to the block axially of the chamber element upon relative rotational movement between the arms and the housing about the common axis of the shafts, a pair of carbon piles mounted within each said chamber element on either side of the block between the block and an end of the chamber, a pair of end wall sections for each chamber, a pair of abutment disks in each chamber situated one between each end wall section and the adjacent carbon pile, and substantially rigid means for adjusting the distance between the end wall sections and their adjacent abutment disks to adjust the preloading pressure on the carbon piles.

JOHN A. BELLIZZI.

REFERENCES CITED

The following references are of record in the file of this patent:

UNITED STATES PATENTS

| Number | Name | Date |
| --- | --- | --- |
| 1,857,688 | Mackenzie | May 10, 1932 |
| 2,007,505 | Smith | July 9, 1935 |
| 2,049,330 | Smith | July 28, 1936 |
| 2,403,952 | Ruge | July 16, 1946 |